US009882790B2

(12) United States Patent
Ollikainen et al.

(10) Patent No.: US 9,882,790 B2
(45) Date of Patent: Jan. 30, 2018

(54) METHOD AND APPARATUS FOR A RECOMMENDATION SYSTEM BASED ON TOKEN EXCHANGE

(71) Applicant: Teknologian tutkimuskeskus VTT, VTT (FI)

(72) Inventors: Ville Ollikainen, VTT (FI); Raimo Launonen, VTT (FI); Atte Kortekangas, VTT (FI)

(73) Assignee: TEKNOLOGIAN TUTKIMUSKESKUS VTT, Espoo (FI)

( * ) Notice: Subject to any disclaimer, the term of this patent is extended or adjusted under 35 U.S.C. 154(b) by 535 days.

(21) Appl. No.: 13/687,237

(22) Filed: Nov. 28, 2012

(65) Prior Publication Data

US 2014/0059213 A1 Feb. 27, 2014

Related U.S. Application Data

(60) Provisional application No. 61/692,315, filed on Aug. 23, 2012.

(51) Int. Cl.
*H04L 12/26* (2006.01)
*G06Q 30/06* (2012.01)
*G06Q 30/02* (2012.01)

(52) U.S. Cl.
CPC ......... *H04L 43/00* (2013.01); *G06Q 30/0282* (2013.01); *G06Q 30/0631* (2013.01)

(58) Field of Classification Search
CPC ............... G06F 17/30864; G06F 17/30; G06F 17/30386; G06F 17/30867;
(Continued)

(56) References Cited

U.S. PATENT DOCUMENTS 7,908,182 B1 3/2011 Gupta
2003/0171122 A1* 9/2003 Kim et al. ............ 455/452
(Continued)

FOREIGN PATENT DOCUMENTS

EP 2 207 348 A2 7/2010
EP 2 242 259 A1 10/2010
(Continued)

OTHER PUBLICATIONS

Fong et al., "Using Genetic Algorithm for Hybrid Modes of Collaborative Filtering in Online Recommenders", In Proceedings of HIS '08, IEEE Computer Society, 2008.
(Continued)

*Primary Examiner* — Ranodhi Serrao
(74) *Attorney, Agent, or Firm* — Young & Thompson

(57) ABSTRACT

Recommendation system based on the actions of a group of users, and not requiring prior metadata, is provided. The recommendation is not limited to from user-to-item (e.g. media recommendation) type; e.g. from user-to-user (e.g. social networking), from item-to-item (e.g. "see also" in internet shopping) and item-to-user (e.g. advertizing) recommendations are supported. The solution utilizes a set of identifiable tokens, associated with each entity, an entity being either a user or an item. Whenever there is an interaction between entities, either existing token sets are updated or new token sets are created such that after an interaction each interacting entity is associated with a token set which resembles more than before the token set(s) associated with the other interacting entity. Recommendation can be produced by searching best matching token sets on the user-to-item, user-to-user, from item-to-item or item-to-user basis.

20 Claims, 7 Drawing Sheets

(58) Field of Classification Search
CPC .......... G06Q 30/0631; G06Q 30/0282; G06N 3/126; H04L 67/306; H04L 43/00
USPC ........................................................ 709/224
See application file for complete search history.

(56) References Cited

U.S. PATENT DOCUMENTS

| | | | |
|---|---|---|---|
| 2006/0010117 A1* | 1/2006 | Bonabeau et al. ................. 707/3 |
| 2009/0012817 A1* | 1/2009 | Squires ................. G06F 19/322 705/3 |
| 2010/0064325 A1 | 3/2010 | Fishman et al. |
| 2010/0223294 A1* | 9/2010 | Winslow .......... G07B 17/00508 707/780 |
| 2010/0325011 A1 | 12/2010 | Foster et al. |
| 2010/0325205 A1 | 12/2010 | Murphy et al. |
| 2011/0010366 A1* | 1/2011 | Varshavsky et al. ......... 707/732 |
| 2011/0016087 A1* | 1/2011 | Freedman ......... G06F 17/30581 707/617 |
| 2011/0185041 A1* | 7/2011 | Hunt ............................ 709/219 |
| 2012/0059819 A1 | 3/2012 | Wheeler et al. |
| 2012/0089581 A1* | 4/2012 | Gupta et al. .................. 707/706 |
| 2012/0205436 A1* | 8/2012 | Thomas et al. ............... 235/375 |
| 2013/0124186 A1* | 5/2013 | Donabedian .......... G06F 17/289 704/2 |
| 2013/0159331 A1* | 6/2013 | Zhang ........................... 707/758 |

FOREIGN PATENT DOCUMENTS

| | | |
|---|---|---|
| EP | 2 249 261 A1 | 11/2010 |
| WO | 2009/146489 A1 | 12/2009 |
| WO | 2010/114903 A1 | 10/2010 |

OTHER PUBLICATIONS

Nandi et al., "P3: A Privacy Preserving Personalization Middleware for Recommendation-based Services", 4th Hot Topics in Privacy Enhancing Technologies (HotPETs), 2011, pp. 1-12.

Finland Search Report, dated Sep. 16, 2013, from corresponding FI application.

International Search Report, dated Nov. 28, 2013, from corresponding PCT application.

* cited by examiner

METHOD AND APPARATUS FOR A RECOMMENDATION SYSTEM BASED ON TOKEN EXCHANGE

FIELD OF THE INVENTION

Generally the present invention relates to electronic computing devices and corresponding systems of multiple interconnected devices. Particularly, however not exclusively, the present invention pertains to provision of privacy-preserving recommendations of entities associated with such devices.

BACKGROUND

There are numerous computational problems requiring a search through a huge number of entries. These problems often require computer programs to perform well also in whenever its environment is changing. As one approach to overcome these challenges, principles of evolution have inspired computational algorithms with great efficiency. One of these types of algorithms is the genetic algorithm.

Concisely stated, a genetic algorithm is a programming technique that mimics biological evolution as a problem-solving strategy. Furthermore, it is a search technique to find approximate solutions to optimization and search problems. Genetic algorithms are particularly applicable to solve problems where the space of all potential solutions is too vast for an exhaustive search within limited time. Genetic algorithms have been applied to scientific and engineering problems and they have been widely used in optimization problems. In addition, genetic algorithms have been applied to automatic programming (evolution of computer programs), machine learning (classification, prediction) and modelling processes in economics and immune systems, ecological processes, population genetics, evolution and learning and in social behaviour in social systems.

The method in genetic algorithms is to move from one population of "chromosomes" to a new population by using something to mimic natural selection of evolution together with operators known from genetics, such as crossover and mutation. Each chromosome consists of genes, each of which represent a particular feature of an individual, and its value represents how this feature is expressed in the solution, or chromosome. The selection operators choose the chromosomes in the population that are allowed to reproduce. In average, the chromosomes with better fit produce more offspring than the less fit ones.

The solutions of genetic algorithms may be represented with context vectors. They are high-dimensional information representations that encode the semantic content of the textual entities they represent. These high-dimensional vectors consist of real-valued numbers or components.

Recommendations have become essential in creating additional value for mobile service providers. Contexts play a focal role in understanding what the users of a mobile service want or need. Thus, understanding user's context and acting based upon it is of the utmost importance for a mobile service to be successful. On a more general approach, it can be said that there are numerous computational problems, the purpose of which is to predict the behaviour of an entity, and for these problems genetic algorithms are applicable. Also, genetic algorithms can be used for understanding the context of a user and making recommendations thereafter.

In the patent application EP 2,249,261 Arpit Mathur presents a recommendation system which is based on social networking. In the presented approach preference information of a user is a necessity. Content item, which is accessed by a member of the same group as the said user, is recommended to the user based on this group relation. This is also known as collaborative filtering.

Content-based filtering is utilized in the patent application WO 2,009,146,489 by Dalgleish Andrew Robert. An item is recommended to a user by using rules, which determine the links between item features and the user's personal features.

Fishman Alex and Chai Chai Crx K. introduce a community-based recommendation engine in the patent application U.S. 2,010,064,325. User receives a content recommendation from her contact. The recommendation engine determines the action to be performed according to the recommendation and on one or more rules, such as trust level of the contact, etc.

Based on similar relevance values as above, such as trust or similarity between the search user and the entity providing the search results, a recommendation system is presented in the patent application U.S. 2,011,010,366 by Varshaysky Roy et al. The entities may be virtually anything. The relationships between the user and the entity may be created through many different contact mechanisms and may be unidirectional, asymmetric bidirectional, or symmetric bidirectional relationships. The relationships may be different based on topic or other factors.

In the patent application EP 2,207,348 Barbieri Mauro and Pronk Serverius examine the challenges related to insufficient metadata. They present an apparatus for controlling of a recommender system which provides recommendations for a new, unknown domain, or area of interest, by using one or more user profiles from other, known domains. This is achieved by forming or using translations or relations between the known domains and the new domain, and by exploiting these translations or relations to extend the profiles in the known domains into the new domain.

Becker Ralf et al. present an invention (patent application EP 2,242,259) optimized for cross-domain recommendations by enabling the issuing of a recommendation for related predetermined content at a particular appropriate timing. Taken into account in the process are current broadcast content, past and future programs available from a service network and the user's viewing history.

Foster Benjamin et al. describe in the patent application U.S. 2,010,325,011 a method to facilitate generating listing recommendations to a user of a network-based commerce system. This method identifies a search term that corresponds to a category of items, which includes a plurality of listings hosted by a network-based system. Furthermore, a recommendation query is generated that includes the identified search term. A listing is identified from the plurality of listings as a recommended listing. The identification is based on the recommendation query.

Based on user's listings representing items for sale on the marketplace, user profile is formed, in the patent application WO 2,010,114,903 by Kassaei Farhang. The user profile is compared with other similar users who have subscribed to various applications, and the impact those applications have had on the metrics of the similar users is calculated in order to determine what impact the applications will have on the user in question. The impact, combined with user preferences, is used to suggest appropriate applications to the user.

Murphy Shawn M. et al. present in the patent application U.S. 2,010,325,205 an event recommendation service. Known selection data is compared with media content selected by a user, location data that corresponds to location of the user and event data are used to make recommendations of events the user is likely to attend.

Thus many prior art solutions somewhat regrettably disclose users' personal history or personal preferences in a process of requesting a recommendation. Yet, constructing a recommendation system seems to require various tedious preparatory stages of collecting and processing metadata.

SUMMARY

One objective of embodiments of the present invention is to facilitate constructing user privacy and anonymity-preserving recommendation system that does not require prior metadata, but is based on actions of a group of users.

In one aspect, a method for providing recommendations of entities to be executed by at least one electronic device, optionally a terminal, such as a mobile terminal, or a network server,
  obtaining a first token set associated with a first entity, optionally a user of said at least one electronic device, wherein the first token set comprises a plurality of identifiable tokens,
  adapting the first token set on the basis of interaction between the first entity and a second entity, optionally a resource available through a network accessible service, wherein based on a second token set associated with the second entity the first token set is altered to increasingly resemble the second set and based on the first token set the second token set is altered to increasingly resemble the first token set,
  obtaining information regarding a plurality of token sets associated with a corresponding plurality of entities,
  determining an indication of similarity between the first token set and each set in said plurality of token sets, and
  based on the determined indications of similarity, establishing a recommendation regarding a sub-set of one or more entities from said plurality of entities.

The at least one electronic device is thus configured to adapt the first token set on the basis of the interaction. Instead of the at least one electronic device, the second token set may be alternatively adapted by at least one other electronic device as described in more detail hereinafter.

In some embodiments, the first entity refers to a user of a terminal device, advantageously with a Web (World Wide Web) browser. The second entity may refer to a network accessible service, advantageously a Web site or other online service, and optionally further with a unique uniform resource identifier (URI).

In various embodiments of the present invention, each of the entities may be associated with at least one token set. The tokens may advantageously be or comprise integers, advantageously 32 bits each, whereas the token sets may contain hundreds, if not thousands, of tokens.

Different electronic devices, or "computing units", such as terminals or servers are preferably capable of accessing the token sets associated with their owners such as device users: a first computing unit has a means to access the token set(s) associated with the first entity, a second computing unit has a means to access the token set(s) associated with the second entity, and so on.

Since one physical computing unit, for example a network service, may maintain a plurality of token sets associated with different entities, we hereinafter refer processing a token set associated with a unique entity as a corresponding token process: the token process associated with the first entity is referred as the first token process, the token process associated with the second entity as the second token process, and so on. It should be further noted that although we for clarity refer to a "universal resource locator (URL) of a token process", it may be implemented as a combination of universal resource locator of the computing unit and applicable identification of the token process within the computing unit, for instance.

In various embodiments, a terminal device of a user associated with a first token process (and thus first token set) has access to a means for resolving universal resource locator (URL) of a second token process (and second token set). These means may utilize as input either a unique identifier, such as universal resource identifier, of the service, or other data optionally transferred to the terminal from equipment associated with the service.

An embodiment of a method in accordance with the present invention may comprise any one or more of the following items as such or in combined or split form:
1. Identifying the user of the terminal device, which may optionally take place by the user logging in to a user account of the terminal unit.
2. Detecting the user accessing the service, the access being related to the uniform resource identifier of the service. Accessing a Web site service may be advantageously detected either by a Web browser extension or by monitoring requests to a DNS service, for instance.
3. Requesting the universal resource locator of the second token process from the means for resolving the universal resource locator of the second token process. In practice, the means for resolving the universal resource locator of the second token process may advantageously consist of or at least comprise a look-up table which translates the uniform resource identifier of the service to the uniform resource locator of the second token process. Alternatively, the content received from the service may be read and searched for a specific tag or another marker explicitly defining the uniform resource locator of the second token process. In practice, it may be beneficial to first search for the tag, and if it is not found, then have a look at a look-up table. It should be noted that the means for resolving the universal resource locator of the second token process may be integrated to the terminal unit itself, even as a browser extension, or be a service on the network. A look-up table may be realized as a network service potentially shared by several users and with a centralized update procedure.
4. Receiving the universal resource locator of the second token process as the response.
5. Utilizing at least part of the universal resource locator of the second token process in requesting the first computing unit to exchange information with the second computing unit.
6. As a response to the request, the first computing unit requests from the service at least a part of a token set associated with the second entity such as the service itself and/or resource(s) accessible via the service, as well as retrieves and sends at least part of a token set associated with the first entity such as the user of the terminal device.
7. The first computing unit receives from the second computing unit at least part of the token set associated with the second entity.
8. Utilizing at least part of the token set received from the second computing unit, the first computing unit modifies at least part of the token set associated with the first entity; and 9. Utilizing at least part of the token set received from the first computing unit, the second computing unit modifies at least part of the token set associated with the second entity.

Further, recommendations can be made by comparing token sets associated with different entities. Since it is likely that entities with more similarities in the token sets have something in common, these entities are more advantageous to be recommended.

The utility of the present invention arises from a plurality of issues depending on each particular embodiment in question. First of all, by means of exploitation of the suggested method and system comprising at least one device various recommendations may be flexibly generated e.g. from a user to an item (e.g. media recommendation), from a user to another user (e.g. social networking), from an item to another item (e.g. "see also" in internet shopping) and from an item to a user (e.g. advertising), for instance. The users' privacy is preserved while they interact with other entities and exchange characteristic data, i.e. token data, to dynamically update such based on the interactions, which subsequently enables providing recommendations through comparisons of characteristic data of different entities and finding common features such as same tokens/token values therein. Indeed, somewhat similar to genetic algorithms, the interacting entities adopt and radiate characteristic data, which is cleverly harnessed in analyzing the potential match or linkage between them. The suggested solution is by nature technically scalable according to the available hardware and software resources, and it adapts to different use cases with ease.

The terms "first" and "second" do not denote herein any particular priority or order. Instead, they are used to distinguish one entity such as a physical or logical element from another entity.

DETAILED DESCRIPTION OF EMBODIMENTS

One idea behind the current invention could be analyzed in the light of exchanging banknotes with individual serial numbers:

If we repeatedly exchanged banknotes with other people we met, and over a cashier desk wherever we went, and wrote down a list containing the serial numbers of the banknotes which have been in our possession, our friends and other people with similar habits, as well as places we visit, would have a tendency of having the same serial numbers in their lists as we have had. This underlying idea has been developed further in the present invention and embodied technically.

The present invention thus enables providing a method for arranging exchange of information between a computing unit associated with a first entity, hereinafter referred as the first computing unit, and a computing unit associated with at least one second entity, hereinafter referred as the second computing unit.

One shall notice that the computing units described in this text may in some embodiments be considered as virtual, preferably residing either in a cloud service or another platform and acting as computing unit for a plurality of entities. In practice, it may be advantageous to include an identification of the respective entity to the universal resource locator of a computing unit and have the same internet domain to carry out functionality of a number of computing units.

Figure 1A:
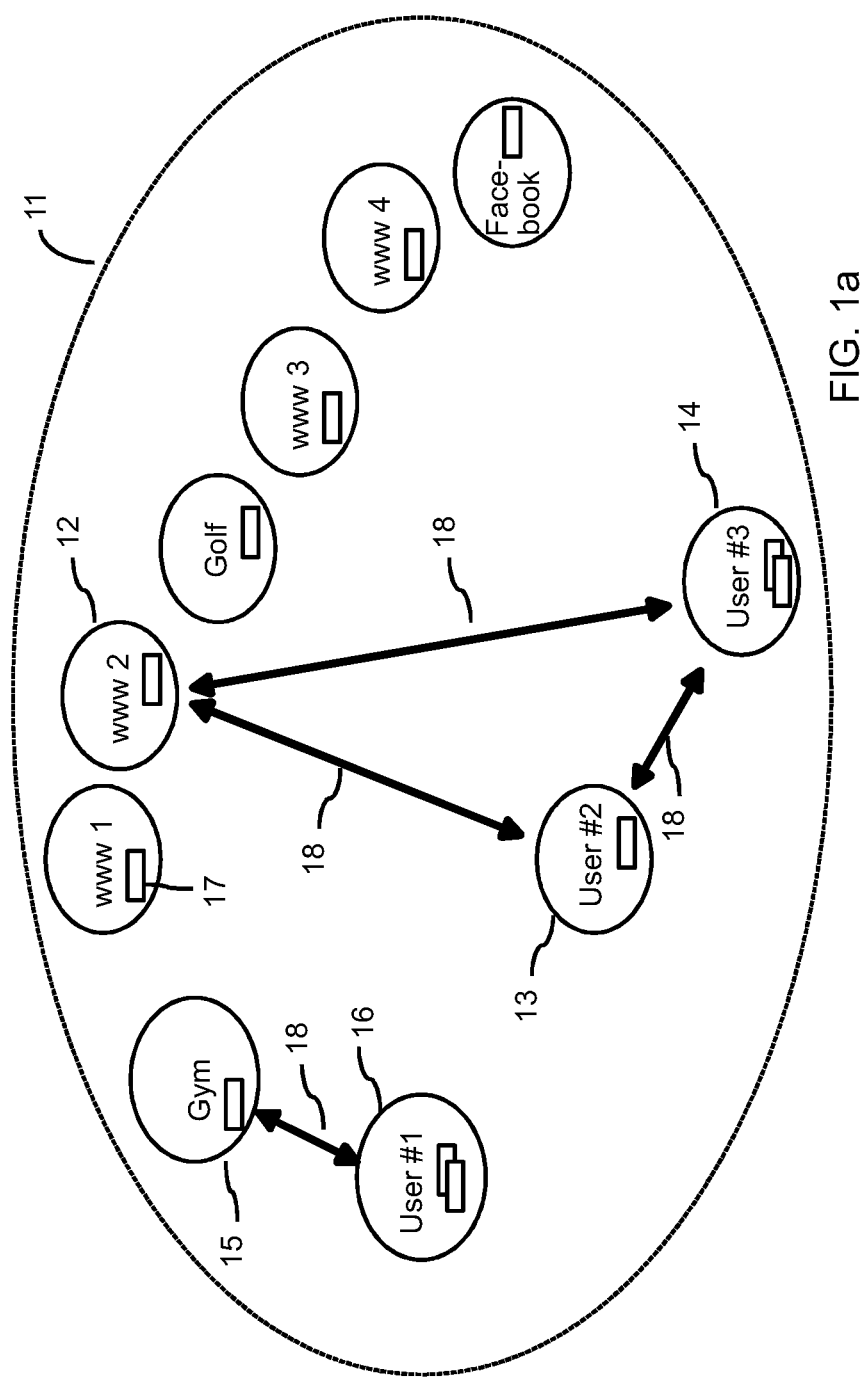
FIG. 1a illustrates a concept of the present invention with a number of units interacting with each other.

FIG. 1a illustrates a concept of having a number of entities 12 . . . 16 belonging to a group 11. These entities may be users, other people, real or virtual places, pieces of media content, database entries: any real or virtual entities that can be involved in a real or virtual interaction 18 can be considered an entity. For instance, in the exemplary description in FIG. 3 User 13 and Web (site) service 12 and/or resources accessible via it may be seen as "entities".

An example of such an interaction is User #1 16 visiting a Gym 15 which occurrence is interpreted as an interaction between User #1 and the Gym 15. Another example could be Users #2 13 and #3 14 simultaneously visiting the same Web service 12, in which case there may not be only interactions between these Users 13, 14 and the Web site service, but also between these Users 13, 14.

Each entity is preferably associated with at least one token set 17. In the beginning a new entity may be provided with a small number of tokens, even just one or few of them, containing random values. These token sets are updated in an interaction certain embodiments of which are described in further detail hereinbelow. Preferably, the tokens are identifiable by a number and/or some other identification-enabling data. However, they do not necessarily have to be universally unique such that each token initially allocated to some entity differs from all other tokens allocated to any other entity as long as the proportion of non-unique tokens is minuscule. In that sense, the tokens may be non-unique. Adaptation or recommendation noise potentially arising from similar tokens initially independently assigned to different entities is considered practically negligible in most foreseen use scenarios.

Moving on to the disclosure of some embodiments for updating token sets with reference to FIG. 2, the interaction 18 generates an Information exchange 28 between token sets associated with the interacting entities, each of the interacting entities associated with a computing unit carrying out the actual information exchange, referred hereinafter as interacting computing units.

It is of importance for the practical value of the invention to provide some means to measure similarity between two token sets. As mentioned hereinbefore, it may be advantageous to use integers as tokens, and the number of tokes may advantageously be hundreds, if not thousands. One advantageous option is to base distance measurement on calculating, how similar values exist in the tokens, for example:

a. Going through each token of the set A 24 at a time, with value $w_i$ closest match from the set B 25 is searched, the closest value being $a_j$ b. Calculating the similarity $s_i=1/(|w_i-a_j|+1)$, the value +1 in the denominator just prevents division by zero. Another positive value may be used as well; a person skilled in the art can experiment the value for optimal results.

c. Calculating distance $d=(N_A \times N_B)/\Sigma s_i$, in which $N_A$ and $N_B$ represent number of tokens in the sets A and B respectively; $N_A$ is used for averaging the sum of similarities $\Sigma s_i$ while $N_B$ makes distances between the sets B of different lengths more comparable.

Figure 1B:
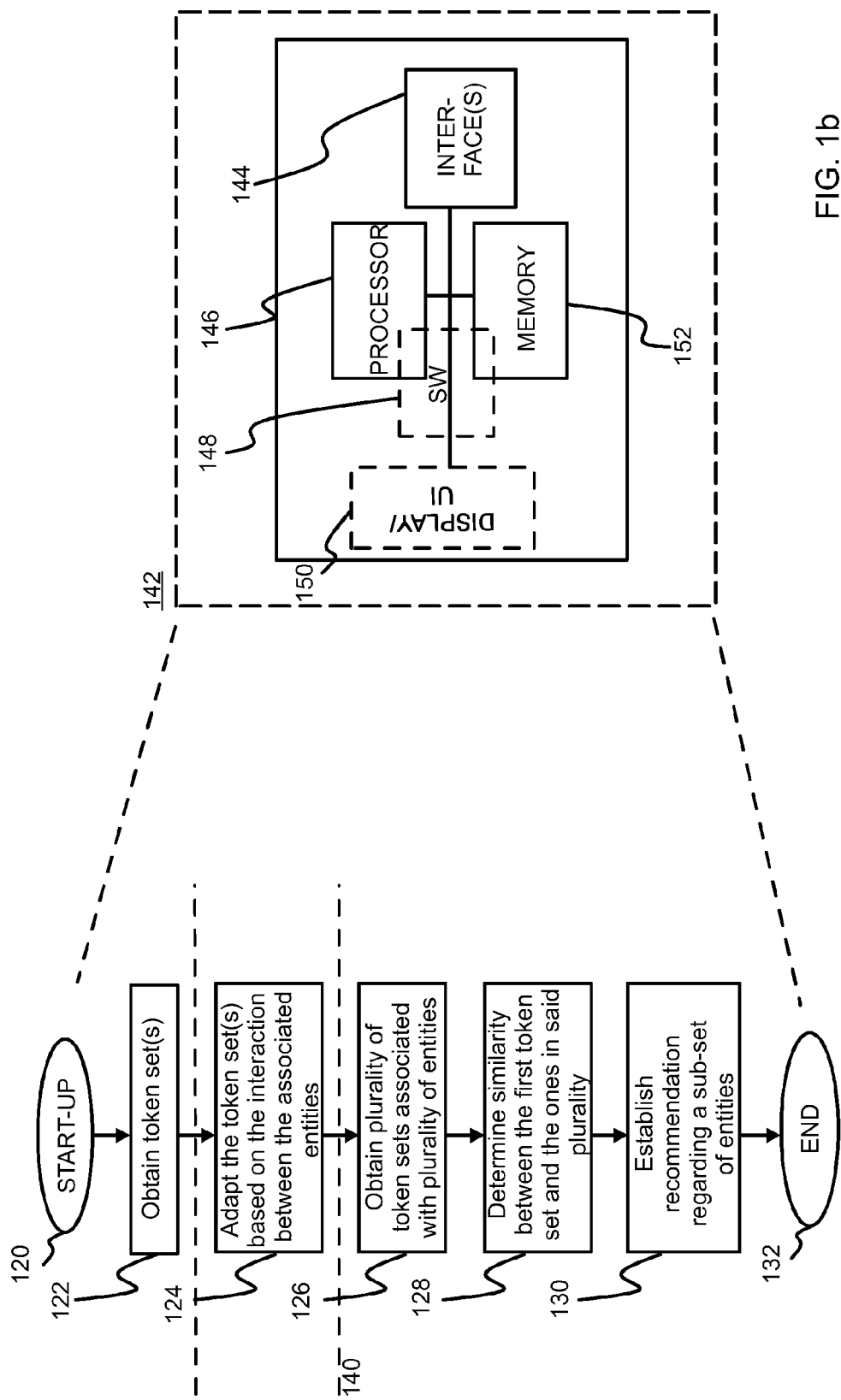
FIG. 1b incorporates a high-level flow chart of an embodiment of a method in accordance with the present invention and a related block diagram.

FIG. 1b is a high-level flow diagram of an embodiment of a method in accordance with the present invention. At start-up 120, the necessary hardware and software, such as terminal device(s) and/or network element(s) like server(s), are acquired and configured.

At 122, the token set(s) associated with a first entity, such as a user of a terminal device, are obtained including a first token set, i.e. information defining the token set(s) at least in a level of detail which suffices for the execution of the remaining method items as represented herein is obtained. Depending on the device or devices executing the method, such as a terminal and/or a server, the device(s) may themselves maintain, or "host", the (information defining) token set(s) or alternatively, at least one functionally connectable remote entity, such as a Web service operated by at least one server, may be configured to store (the information defining) the set(s) for retrieval and use by others as described hereinlater in further detail.

The token set(s) associated with the first entity are needed both in the adaptation procedure 124 and determination of recommendations 140 as disclosed herein. Nevertheless, one shall realize that the adaptation 124 and determination of recommendations 140 are separable features and may be executed also independently, which is indicated in the figure by the broken vertical lines.

Item 124 refers to the aforesaid adaption procedure performed in connection with interaction taking place between the first entity and another entity, such as a network service or a resource optionally accessible therethrough. Herein, a resource may generally refer to anything that has identity such as an electronic document, an image, a Web site or page, a service, or a device. Triggered by the interaction, based on a second token set associated with the second entity the first token set is altered to increasingly resemble, or "reflect", the second set. Based on the first token set the second token set is preferably also altered to increasingly resemble the first token set. In case there are separate physical entities dealing with adaptation (alteration) of the first and second token sets, data transfer between such elements may be required. To alter the first token set, the corresponding executing entity, i.e. logically a first computing unit that may be physically implemented at a terminal or server, for instance, shall obtain at least part of the second token set. To alter the second token set, the corresponding executing entity, logically a second computing unit that may be physically implemented at the same or another terminal or server, shall obtain at least part of the first token set. Data transfer between physical entities typically implies coordinated data transmission (sender) and reception (recipient) in any feasible form over wired and/or wireless medium. In some embodiments, situations may occur where only one token set is adapted based on interaction between the first and second entities. Yet, token set adaptation may take place in response to an occurrence of an event other than the interaction.

Items 126-130 refer to the features of establishing recommendations of other entities to the first entity from the standpoint of the first token set.

At 126, a plurality of token sets associated with a corresponding plurality of entities is obtained. Instead of obtaining information completely defining the token sets in said plurality, at least information enabling the subsequent similarity analysis shall be alternatively obtained. Such, potentially reduced or derived, information may omit a number of unnecessary (in the light of the similarity assessment) elements of the full token set definitions.

Indeed, at 128, an indication of similarity between the first token set and each set in said plurality of token set is then determined based on information on the first token set and the sets in the plurality.

At 130, based on the determined indications of similarity, a recommendation regarding a sub-set of one or more entities from said plurality of entities is established. For example, a number of entities that are considered similar to the first entity in view of the associated token sets according to the utilized decision-making logic may be included in the sub-set. In some embodiments, a predetermined number of most similar entities may be included in the sub-set. Alternatively, all entities fulfilling the criterion or criteria defined by the logic may be included, for instance.

At 132, the method execution is ended.

As the persons skilled in the art will understand, the execution of various method items regarding the adaptation or recommendation procedures may be flexibly repeated upon need. Yet, several adaptation rounds 124 may occur in a row without intermediate recommendation rounds 140, and vice versa. More detailed examples of adaptation, related interaction, and provision of recommendations are set forth hereinafter.

The sketch at 142 illustrates a high-level block diagram of an embodiment of an electronic device, or "computer", for executing the method. A computer program product embodied on a carrier medium, such as an optical disc or a memory card, comprising instructions (software 148) to carry out method items described herein, when run on a computer, may be provided. A number of different functional or logical entities may be formed by the software or other control logic and the underlying hardware. For example, a data transfer entity may take care of token data transfer and other communication, an adaptation entity may perform adaptation, and a recommendation entity may execute token set comparisons and determine recommendations based thereon. The computer, which may be included in (or be considered to be formed by) a terminal or a network server, for example, shall thus contain the necessary processing element(s) 146, such as microprocessor(s), signal processor(s) and/or microcontroller(s), and memory element(s) 152 such as memory chip(s) to process and store the instructions (and various other data), respectively. Yet, the computer shall include a communications interface 144 such as a wired or wireless transceiver for communicating with external entities, such as network(s) and/or terminal(s), and exchanging e.g. token data. Cellular, LAN (Local Area Network, e.g. Ethernet) or WLAN (Wireless LAN) communication may be enabled among other options. A user interface 150 may be provided for user-device interaction, i.e. receiving control input from the user and/or providing output to the user. Several such devices 142 may be functionally connected to establish a desired functional entity.

Figure 2:
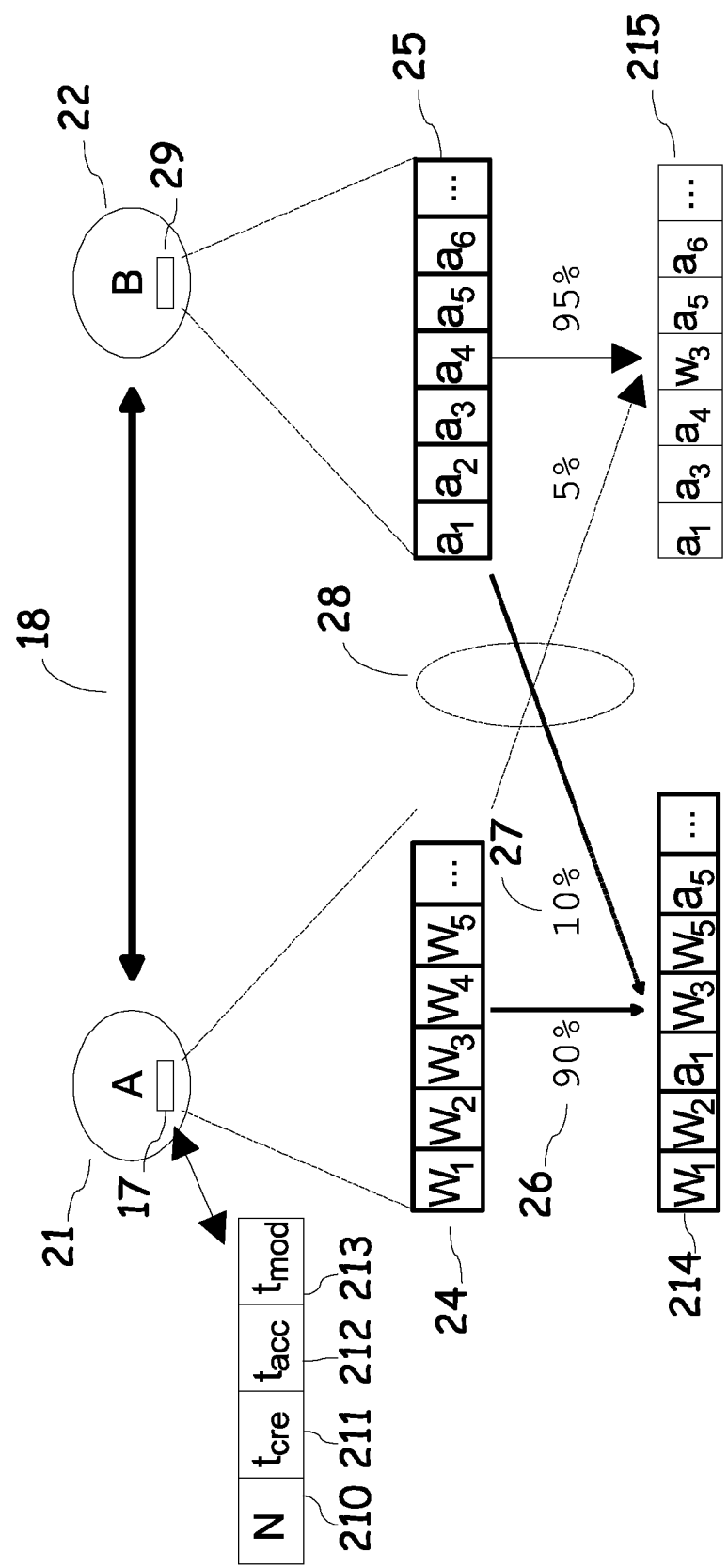
FIG. 2 illustrates the first embodiment of the invention, with updating existing data sets associated with interacting units.

FIG. 2 illustrates one merely exemplary concept on how the token sets 17, 29 associated with each interacting unit 21, 22 are updated as a result of the interaction 18. The update of a token set is based on the Information exchange 28, particularly receiving at least part of another token set, the set associated with the other interacting entity.

In this embodiment a token set 24 associated with the first interacting unit 21 may be updated simply by copying there a number of tokens from the token set 25 associated with the second interacting unit 22. The actual number of tokens copied may be determined as a percentage 27 indicating how large the intended change to the token set is (whereas in contrast, percentage 26 indicates the portion of the original token set to remain unaltered during the interaction 18): Advantageously, the percentage 27 indicates the number of tokens copied relative to the total amount of tokens in the set. Advantageously at least one token is copied. A suitable percentage may be from a few percent up to 20% or so, and it can be experimented for optimal results by a person skilled in the art.

Choosing the tokens to be copied from the other token set may be based on a random selection.

From a practical point of view, it may be advantageous to associate a value for each token set indicating how many times it has been updated 210. Further advantages may be obtained if timestamps of creation 211, last access 212 and/or last update 213 are associated with the token set.

For instance, the percentage may be made regressive by reducing the percentage 27 in subsequent updates. For instance the following equation provides regressive influence:

$$p_k = p_0/(N+1)$$

where $p_k$ is the regressive percentage, $p_0$ the maximum percentage and N 210 the amount of previous updates to the token set.

As a result the updated token sets 214, 215 are likely to have smaller distance between each other they originally 24, 25 had.

A maximum number of tokens may be defined as well, causing repeating update processes to eventually fill up the token set to the maximum. In this case space may be released by removing existing tokens randomly in order to make space for the update. Instead of deleting tokens in random, also deleting one token from a token pair which has closest resemblance in the token set, is also feasible although more computationally intensive. As an example of third method the token pair may be replaced by a single token which has an average value of the deleted tokens.

One should keep in mind that full disclosure of the other token set is not necessarily required for update, thus a partial disclosure may also be performed. In this case only the required amount of tokens may be requested from the other token set in the Information exchange 28.

After a number or updates, the token sets associated with the entities which have been interacting with each other are likely to increasingly resemble each other; that is, having more tokens in common and thus becoming increasingly similar to each other when measured with the chosen metric. This is one reason why the present invention enables constructing an efficient recommendation system: Recommendations for a particular unit may be carried out by searching for greatest similarity between a token set associated with the particular entity, hereinafter referred to as "primary token set", and the token sets of all other relevant entities, hereinafter referred as "searchable token sets". Those entities which have searchable token sets with smallest distance to the primary token set are the ones to be recommended in most embodiments.

In practice, such procedure may contain items of
a) requesting searchable token sets associated with different entities 11,
b) receiving searchable token sets for comparison,
c) calculating distances between the primary token set and each of the received searchable token sets
d) memorizing the smallest distances and the entities associated with them, and
e) returning the list of entities associated with the token sets with smallest distances to the primary token set.

Also, the following procedure may be performed
a) requesting searchable token sets associated with different entities 11 while sending at least part of the primary token set to the second computing unit(s),
b) having the second computing units to calculate distances between the primary token set and each of the searchable token sets accessible by the second computing unit
c) receiving identifiers, advantageously temporary identifiers of entities associated with the token sets with smallest distances from the second computing unit(s)
d) memorizing the smallest distances and the identifiers associated with them,
e) requesting entities associated with token sets of the smallest distances from second computing units using the identifiers, and
f) returning the list of entities associated with the token sets with smallest distances to the primary token set.

The sub-set, or "list", thus generally comprises a lower number of entities than the initial plurality of searchable sets.

Although trivial for a person skilled in the art, it is perhaps in order to clarify the above mentioned term "relevant": If the invention is used to enable media content recommendation, only the token sets related to pieces of media content may be relevant as searchable token sets (user-to-item). If trying to find companion when visiting a bar, only the token sets associated with those persons visiting the same bar at that moment may be relevant (user-to-user). If searching for "see also" items in a Web store, only the token sets associated with items for sale in the same store may be relevant (item-to-item).

In the "see also" case the primary token set may not necessarily be the token set associated with the person browsing the Web store, but with the item currently presented on the screen.

When searching for the most suitable people for an advertisement (item-to-user) one feasible approach would be having a banner advertisement on a Web page. An interaction may be engaged whenever the banner is clicked. To whom the particular banner advertisement is displayed at all may be a result from using the token set associated with the advertisement as the primary token set and the token sets associated with all active users as searchable token sets.

Whenever there are more than one unit involved in an interaction, such as a Web site service #2 12, user #2 13 and user #3 14 in FIG. 1a, the interaction can be advantageously divided into individual interactions between each pair of interacting entities: In this example one interaction could be between the Web site service #2 and user #2, one between the Web site service #2 and user #3 and one between user #2 and user #3. Another approach could be merging a temporary token set, combining tokens from each set and use the merged token set as the other set 25 in the information exchange 28 in FIG. 2 for each interacting entity.

From privacy point of view, some entities or token sets may be defined as "private" whereas the rest might be referred as "public". Whenever it comes to a private entity or token set, it is advantageous not to disclose personal history. The token sets described above fulfill this requirement, because there is advantageously no direct mapping between the tokens and interactions in the past; the previously mentioned initialization of the token sets 17 with some random values serves privacy in this respect.

Since a token set is at least partially disclosed in the Information exchange 28, the other interacting entity may adversely attempt to measure similarity between it and a plurality of known other token sets. Small distance between different sets, however, can't be determined as a direct interaction with a certain entity, since the tokens may have been received from just any token set. Since the user with the interacting token set cannot be held responsible for actions of other entities, which may well have had interaction with the unit associated with the known token set, the invention provides a fair degree of deniability.

Figure 3:
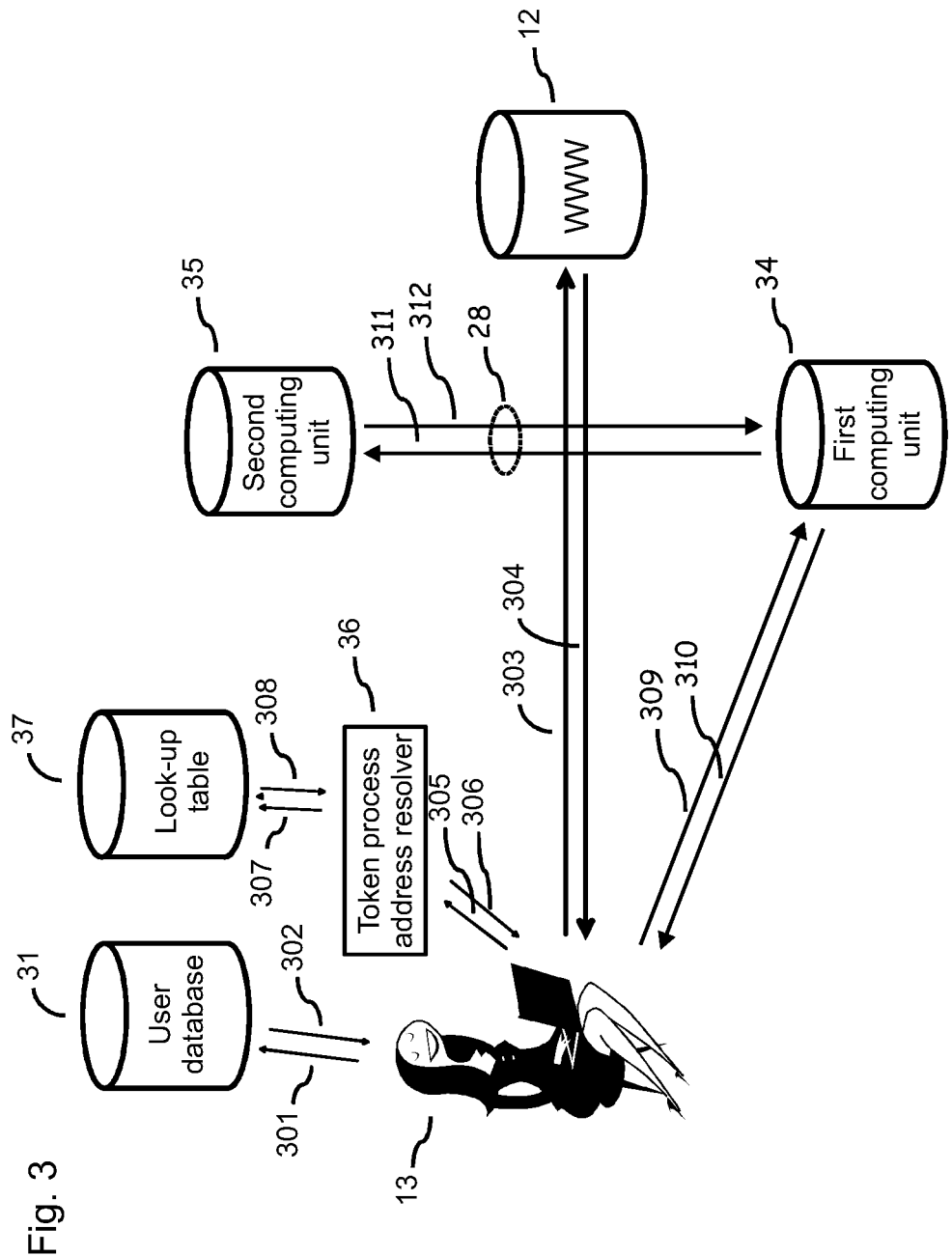
FIG. 3 illustrates an exemplary arrangement and related method in accordance with various embodiments of the present invention.

Switching over to a specific case of having a user of a terminal device as the first entity and a Web site service potentially hosted by one or more servers as the second entity, FIG. 3 illustrates how the related system might operate in practice:

Assuming that the user 13 already is already associated with a token set, it becomes a practical question, how the same set will be accessed on each terminal device 32 the user is using. One feasible alternative would be having a user database 31 which can be accessed over the Internet, containing at least one user ID and the following information related to each user ID, hereinafter referred as processing credentials:

a. a Uniform Resource Locator (URL) of the first computing unit 34 specific for the user ID or the token process associated with the user, that is, the first token process, and b. authorization credentials which permit processing the token sets associated with the user. Authorization credentials may be in practice a message which is digitally signed using certificates issued by a token process authorization service 42 as described below.

When the user 13 begins to use a terminal or a browser the first time, she can request 301 processing credentials from the user database 31 and after a successful response 302 store this piece of information locally to the terminal device 32 for subsequent use. It may not be worth mentioning, but the user database should have appropriate access control for authenticating the user, using best practices well known in prior art.

When accessing 303 content on a Web site service 12, the access may be based on some Unified Resource Identifier (URI) which by definition may be a URL or any other unique identifier in a well specified format. From this point on, there are e.g. the following two advantageous alternatives:

a. The content 304 received from the Web the service may contain explicit information, such as an HTML head element, which contains information of a URL 306 of the token process in the second computing unit 35 associated with the Web site service 12, that is, the second token process. Eventually, this would be efficient way to go. As a concept, the URL 306 is calculated from the content 304 by a token process address resolver 36. The input data 305 for the token process address resolver is in this concept the content 304.

b. In the absence of said explicit information, the URI is sent 305 to token process address resolver 36 which has an access to a Look-up table 37 containing means to convert the URI 307 to the URL 306 of the second token process.

It is important to note that whenever we refer to a URL of a token process in a computing unit it refers also to an identification of the entity in question. The identification in this terminology and as one preferred embodiment is a parameter or other predetermined part of the locator (e.g. https://upcv.domain.fi/tokens?id=0x45c78e103a13029a). As another embodiment of the invention the locator, such as network address, may be associated with several entities, and the identification of the entity exists in the data, not in the locator (e.g. https://upcv.domain.fi/tokens, wherein the addressed resource such as (XML) document may include the ID of the entity). However, for clarity, in this description whenever we refer to URL of a token process in a computing unit, we also refer to identification of the entity as being part of the URL and leave for a person skilled in the art the liberty to implement the identification either as a part of the locator or as a part of the data.

In practice, the means for resolving the URL of the second token process may comprise a Look-up table 37 which translates the uniform resource identifier 307 of the Web site service to uniform resource locator 308 of the token process in the second computing unit 35.

Alternatively, the content 304 received from the Web site service may be parsed in order to search for a specific tag explicitly defining the uniform resource locator of the second computing unit 35. Logically, searching the specific tag may take place in the token process address resolver 36, now getting at least portion of the content 304 as the input data 305.

In practice, it would be beneficial to first search for the specific tag, and if it is not found, then make a request to the Look-up table 37 based on the URI 307. It should be noted that the token process address resolver 36 may be integrated to the terminal device 32 itself, even as a browser extension, or alternatively be for instance a service on the network. Obviously, it is advantageous to implement the Look-up table 37 as a network service shared by several users, having a centralized update.

It may be advantageous in some embodiments, if the first computing unit 34 carries out the Information exchange 28 as a network service, but of course the implementation may also be such that the terminal device 32 contains the first computing unit.

After the second token process URL 306 has been resolved, the information exchange can be requested from the first computing unit 34, sending information containing at least the piece of information of the second token process URL 306 as a part of the request 309.

As a response to the request, the first computing unit 34 carries out the Information exchange 28 by sending 311 at least part of the tokens 24 associated with the user 13 to the second computing unit 35. Mutually, the second computing unit sends 312 in the Information exchange 28 at least part of the tokens 25 associated with the Web site service 12. After receiving tokens from the other computing unit, the token sets 24, 25 are updated as described earlier and illustrated in FIG. 2. Signal 310 represents either acknowledgement of the executed information exchange procedure or alternatively an acknowledgement of receiving the tokens 311 for non-real-time processing.

Figure 4:
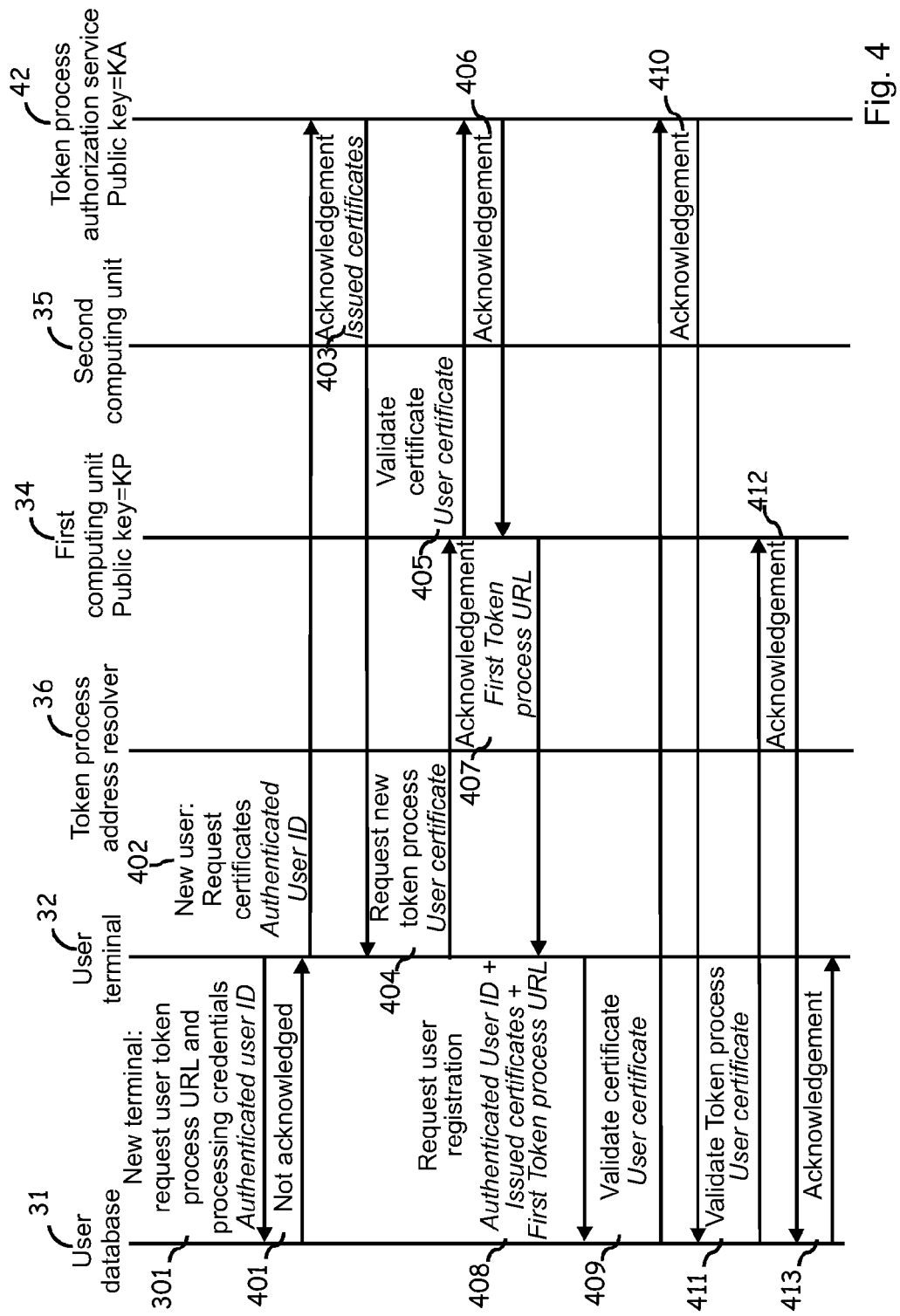
FIG. 4 illustrates a merely exemplary data graph for creating new user account to the system.

Some exemplary details of how a new entity, in this example being the user 13, might be registered in the system are illustrated in FIG. 4: In the illustration, the user is accessing Web site service 12 with a Web browser within the user terminal 32, and the browser does not have access to locally stored processing credentials.

In this example the user terminal is first requesting 301 processing credentials from the user database 31. At this point the user is advantageously authenticated by a trusted third party. From a practical point of view the process may contain two phases, as a query of user existence in the user database does not necessarily need strong authentication, if any, but retrieving processing credentials from there does.

The system contains advantageously a token process authorization service 42 which may utilize existing public key infrastructure (PKI). The revocation mechanisms in PKI may become useful in cases when a user tries to use the system adversely.

Now, assuming that the user does not exist in the database, a user registration process is in order. As a concept which of course may be designed in numerous way by a person skilled in the art, the new user requests certificates 402 from a token process authorization service 42 using her terminal device 32. At this point a strong authentication according to best practices, not illustrated in this figure, is advantageous. As a certificate authority in PKI, the token process authorization service issues and returns (403) certificates to the user terminal 32.

With the certificates, the user terminal 32 requests 404 an account for a new token process in the first computing unit 34 using a certificate issued by the token process authorization service 42. Whenever we refer to "user certificates", it advantageously contains also the user identification used in requesting the certificates 402. The first computing unit advantageously validates 405 the certificate from the token process authorization service 42.

It should be noted that whenever validating a certificate from the token process authorization service, at least all the data which contains user identification should be advantageously encrypted by using public key of the token process authorization service 42, if there is any chance that the identification would be seen by an adverse third party. In these cases the data containing user identification should advantageously further salted by a random value in order to have the ciphertext containing user identification different each time. These methods are well known in prior art: As a simple implementation, the plaintext user identification could AES (Advanced Encryption Standard) encoded using PCBC mode (propagating cipher block chaining) and a random value in the first encryption stage (usually referred as M1). The key may be a random value which will subsequently be delivered together with the ciphertext, after being encrypted by a public key of the token process authorization service. When the token process authorization service receives the ciphertext and the encoded key, it first decodes the key using its private key, decodes PCBC message, removes the random value and validates the plaintext credentials. In other words, instead of sending an "User certificate"

$$E_K(rnd|\text{User certificate}) + E_{KA}(K)$$

would be sent, $E_K$ being the e.g. AES-PCBC encryption using K random key, and $E_{KA}$ the public key encryption using KA public key of the token process authorization service.

Figure 5:
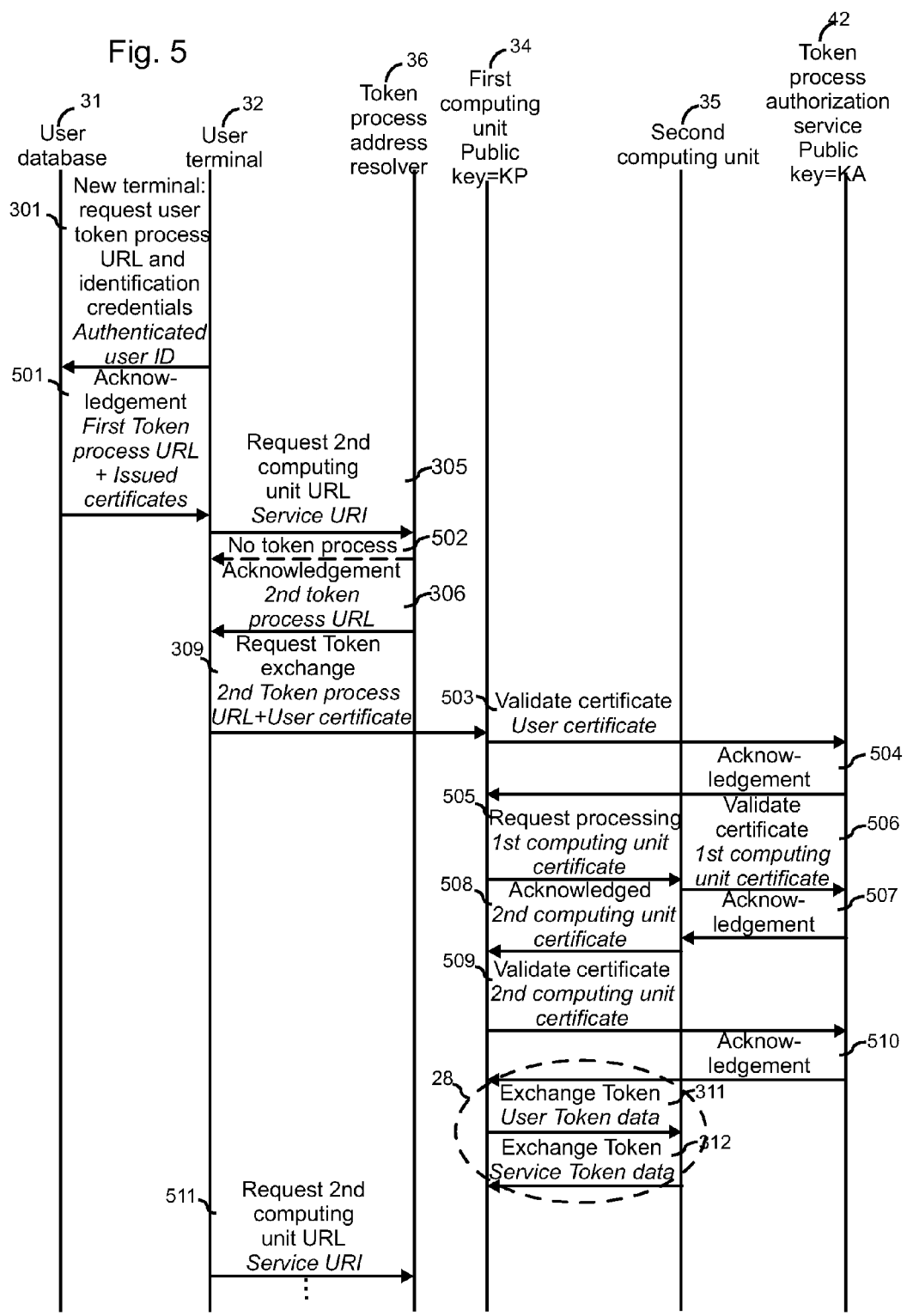
FIG. 5 illustrates a merely exemplary data graph for information exchange.

Between trusted parties and secure communications this encryption may not be necessary, although always illustrated in FIG. 4 and FIG. 5; this consideration who trust each other, and to which extent, can be left to a person skilled in the art of information security, designing the actual implementation.

By doing this, the anonymity of the user remains at all stages between the credential encryption and the token process authorization service 42. Furthermore, because of the random value prefix there will not be too many, if any, similar encoded credentials trespassing the network originating from a single user: Without the random value the same user would possibly send similar credentials, making it possible to track the individual user.

So, after the user was successfully acknowledged 406 by the token process authorization service 42, the first computing unit sends an acknowledgement 407 to the User terminal 32, containing the first token process URL for processing the tokens of the user. The URL may advantageously contain a fixed locator of the first computing unit and user identification.

It would be advantageous, if the second computing unit could be able to receive user identifications salted by a random value and encrypted by its public key the same way described above for the token process authorization service 42. This would not be necessary for accessing Web site or other public services, since, as will be described later, a public service does not have to be aware of the identity of the user; it would rather be for the Information exchange (28) between individual users who may not want to disclose any of their identity between each other.

In our example of a new user the process continues by registering the new user to the user database 31: The user terminal 32 sends request for the registration 408 accompanied with authenticated user ID (user authentication not illustrated here, either, since it's prior art), issued certificates and the first token process URL.

It is advantageous for the user database to validate 409, 410 User certificate from the token process authorization service 42, and validate that the User token process exists 411, 412. At its simplest the request may be signed using the private key in the Issued certificates.

It should perhaps be noted that since the user database 31 will contain the private key of the Issued certificates, it should in this arrangement be a trusted party for the user 13. Instead of a physical unit, the user database could also be an encrypted repository, the key being available to the user terminal 32 from another trusted source; In this case the functionality of the user database would be divided between several units. Therefore, the user database can also be considered rather as a virtual, not physical unit.

It should be also noted that the user database 31 may also be provided by the same trusted party as the first computing unit 34.

Following the previous example and regarding the existing user(s), in the scenario illustrated in FIG. 5 the user 13 has an entry in the user database 31.

In this example, too, the user terminal is first requesting 301 processing credentials from the user database 31, with appropriate authorization. Unlike in the example in FIG. 4, in this example the user database replies 501 with an acknowledgement containing the first token process URL and at least the part of User certificates which enable signing an authorization for processing tokens on behalf of the user 13.

Whenever the user accesses a Web site service 12, the Unified Resource Identifier (URI) is sent 305 to the token process address resolver 36 as described earlier, and the token process address resolver responds with the second token process URL 306. As mentioned, the URI may either be explicit or exist in the content received from the Web site service.

There is a chance that the no token process exists 502 in the Look-up table 37. One approach for resolving this is creating a new token process for the Web site service and associating the URI of the Web site service with the URL of the newly created token process in the Second computing unit. If performing this process whenever necessary, there may never be a response that the token process does not exist 505.

So, let's continue our example with the normal case that the token process for the Web site service exists 306: The request for token exchange is sent 309 to the first computing unit 34, the request containing the second token process URL 306 associated with the Web site service 12 as well as the user certificate for authorizing the token exchange in the first computing unit. The request at its simplest may be just a message signed with the private key issued in the certificates 403.

Whenever there may be a chance for misuse, the first computing unit 34 advantageously validates the certification 503, 504 before requesting token processing 505 from the second computing unit 35. In this request 505 the first computing unit sends its own certificate (signed request, as described earlier) to the second computing unit, which in turn validates 507 the certificate from the token process authorization service 42. After successful validation, the second computing unit sends its own certificate to the first computing unit 508 which validates it from the token process authorization service.

A person skilled in the art may advantageously use SSL/TLS (Secure Sockets Layer, Transport Layer Security) protocol for any authorization between the first 34 and second computing unit 35, validating the certificates in the token process authorization service 42. By doing this, all communications between the first 34 and second computing unit becomes secured, too.

After all these validations have been successfully processed, the token exchange is processed 28, without the second computing unit 35 knowing the identity of the user 13.

In subsequent requests 511 it may no longer be necessary to access user database 31, but use locally stored processing credentials instead.

Regarding other potential embodiments of the present invention, in the example of FIG. 4 it should be noted that the new user registration may be a portal service triggered by the user 13 using the user terminal 32.

The order (who validates who first in the process) may be different from the example, while it is advantageous and the essential message from the examples of FIG. 4 and FIG. 5 to have method for preventing unauthorized user and revoke access from adverse parties.

Different presented components may be integrated together, for instance the user database 31 may be integrated with the token process authorization service 42 or a first computing unit 34.

As a further embodiment it would be sometimes advantageous to have no requirements for a user 13 to obtain a certificate from the authorization service 42. As mentioned before, the token exchange may be processed 28 without the second computing unit 35 knowing the identity of the user 13. The first computing unit does not necessarily have to manifest any of the users to the rest of the system. In this embodiment the first computing unit may create and maintain token sets for at least one user and by its own authentication methods validate the user whenever an operation to at least one token set associated with the user is requested. In this respect it would be an internal matter for the first computing unit to maintain an internal user database.

Although the presented invention is described by means of a user 13 accessing a Web (site) service 12, it should be noted that the applicability of the suggested solution is not limited to this particular case.

The Information exchange 28 may be triggered by for instance reading an optical code, such as a QR (Quick Response) code, or an NFC (Near-Field Communication) tag, by a smartphone. This optical code or NFC tag may contain the service URI, followed by step 305 or the second token process URL, followed by step 309. In these cases the smartphone may advantageously be the user terminal 32.

Figure 6:
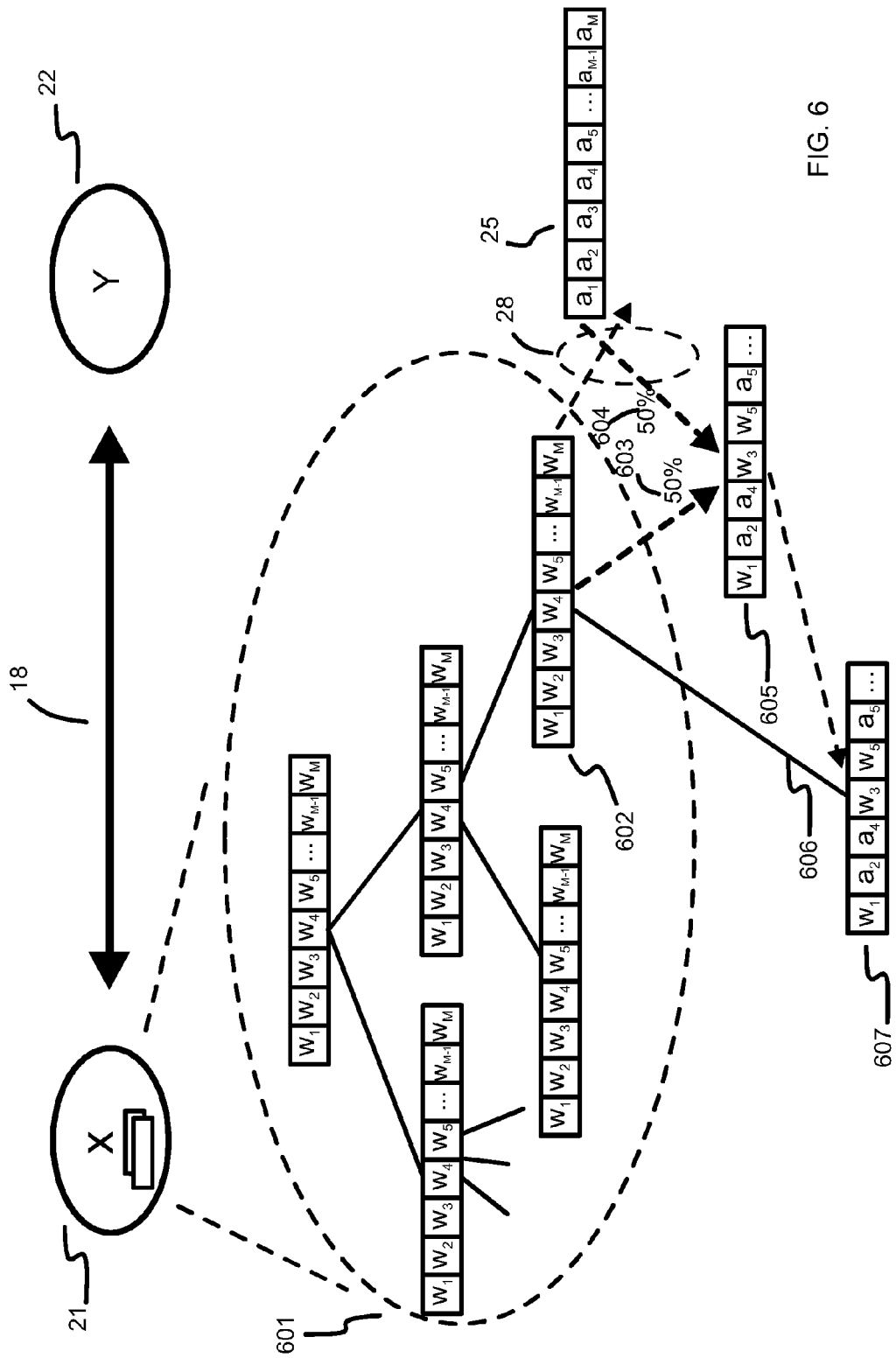
FIG. 6 illustrates a concept of creating different token set for different contexts.

Let's have a look at FIG. 6. As mentioned, at least the first entity may have a number of token sets 601, perhaps motivated by different contexts the entity may be in. One advantageous method for creating different token sets for different contexts is to search for the smallest distance between the other token set associated with the second entity and the token sets associated with the first entity and selecting the token set with smallest distance to be the token set for the interaction, hereinafter referred as the active token set 602.

In this case it would be advantageous to receive 312 the token set from the second computing unit and search for the active token set to be sent from the first computing unit to the second computing unit. If the smallest distance is greater than a certain limit, it can be reasoned that the first entity is in a context it has not been in before. In this case a new token set 605 may be created as a combination between the active token set 602 and the other token set (25), for instance using equal percentages 603, 604 for proportions, how many tokens from each token set are selected to the new token set. This selection takes advantageously place as random selection.

This approach leads to genetic evolution within the token sets, as the new token set 605 can be advantageously arranged into a family tree hierarchy as a child 607 of the active token set 602 with a link 606 between them.

The aforesaid approach may be utilized for detecting abnormal behavior in a complex system for instance, in fly-by-wire aircraft avionics, military applications, etc., comparing e.g. system statuses in real operation with system statuses in simulation. In some embodiments, various abnormal situations indicated by unexpected or at least previously unmaterialized or non-simulated combinations of sensor data as provided by a number of sensors may be detected and used to trigger establishing a new context with associated token set (of sensor data) and/or sending an alarm/notification signal among other potential responsive actions.

The invention claimed is:

1. A method for providing recommendations of entities to be executed by at least one electronic device, the method comprising:
   obtaining a first token set associated with a first entity, the first token set comprising a plurality of identifiable tokens;
   adapting, at one or more processing devices, the first token set based on an interaction between the first entity and a second entity, based on a second token set associated with the second entity, the first token set being altered to increasingly resemble the second set, and based on the first token set, the second token set being altered to increasingly resemble the first token set;
   obtaining information, at the one or more processing devices, regarding a plurality of token sets associated with a corresponding plurality of entities;
   determining, at the one or more processing devices, an indication of similarity between the first token set and each set in said plurality of token sets; and based on the determined indications of similarity, establishing, at the one or more processing devices, a recommendation regarding a sub-set of one or more entities from said plurality of entities,
wherein the first entity obtains at least part of the second token set and alters the first token set to increasingly resemble the second token set using the obtained part of the second token set, and the second entity obtains at least part of the first token set and alters the second token set to increasingly resemble the first token set using the obtained part of the first token set.

2. The method according to claim 1, wherein the interaction involves an information exchange between a first computing unit of the first entity and a second computing unit of the second entity, the first entity being a user of a terminal device and the second entity being associated with a unique uniform resource identifier relating to a network accessible service,
wherein the first and second computing units are configured to access the first and second token sets associated with the first and second entities, respectively, and the terminal device has access to a means for resolving a universal resource locator of a second token process for processing the second token set in the second computing unit,
wherein the method further comprises:
identifying the user of the terminal device,
detecting said user accessing the service, the access being related to the uniform resource identifier of the service,
giving said uniform resource identifier, requesting the universal resource locator of the second token process from the means for resolving the universal resource locator of a token process,
receiving the universal resource locator of the second token process as the response,
utilizing at least part of said universal resource locator of the second token process in requesting the first computing unit to exchange information with the second computing unit,
as a response to said request and utilizing the received universal resource locator of the second token process, requesting, by the first computing unit, from the second computing unit at least a part of the second token set associated with the second entity, and sending at least part of the first token set associated with the first entity to the second computing unit to enable said second computing unit, through utilization of at least part of the first token set received from the first computing unit, to adapt at least part of the second token set associated with the second entity,
receiving, at the first computing unit, from the second computing unit at least part of the second token set associated with the second entity, and
through utilization at the first computing unit of at least part of the second token set received from the second computing unit, adapting at least part of the first token set associated with the first entity.

3. The method according to claim 2, wherein said means for resolving the universal resource locator of the second computing unit utilizes as input a unique identifier of the second entity.

4. The method according to claim 2, wherein said means for resolving the universal resource locator of the second computing unit utilizes as input data transferred from the second entity to the terminal device.

5. The method according to claim 1, wherein token sets including the first and second token sets are comparable so as to enable measuring their mutual distance forming at least part of said indication of similarity.

6. The method according to claim 1, wherein the first and second token sets are represented in a mathematical space which enables measuring distance between the two token sets, and adapting the first token set based on the second token set reduces such distance between them.

7. The method according to claim 1, wherein said adapting contains at least one element selected from the group consisting of: copying at least one token from the second token set into the first token set, replacing a token in the first set with a token from the second set, modifying a token in the first set based on the value of at least one token in the second set, and deleting a token from the first set.

8. The method according to claim 1, wherein the extent of adaptation relating to the first token set is reduced according to a predetermined logic in response to each executed adaptation round.

9. The method according to claim 1, wherein said determining and establishing comprises:
calculating distances between the first token set and each set in said plurality of token sets,
memorizing the smallest distances and the entities associated with the smallest distances, and
returning the list of entities associated with the token sets with the smallest distances to the first token set.

10. The method according to claim 1, wherein each token set is associated with at least one indication selected from the group consisting of: an indication of how many times the token set has been updated, a timestamp or other temporal indication of creation, a timestamp or other temporal indication of last access, and a timestamp or other temporal indication of last update, the at least one indication being utilized in the adaptation.

11. The method according to claim 1, wherein said plurality of entities includes at least one entity selected from the group consisting of: media content, a user, a service, and an item for sale.

12. The method according to claim 1, wherein at least the first token set is stored in a database hosted by at least one network server accessible via the Internet for retrieval by terminal device and subsequent use in connection with network accessible services.

13. The method according to claim 1, wherein the method is executed by a terminal device comprising at least one element selected from the group consisting of: cellular phone, smartphone, PDA (personal digital assistant), wristop computer, tablet, laptop computer, and desktop computer.

14. The method according to claim 1, wherein the method is executed by at least one network element, the at least one network element being a server.

15. The method according to claim 1, wherein the first entity is associated with multiple token sets, each token set targeted for different use context.

16. The method according to claim 1, wherein the method is triggered by a terminal device in response to reading an optical code or communication with an Near-Field Communication (NFC) tag.

17. An electronic terminal device, comprising:
a processor configured to process data;
a memory configured to store data; and
a data interface configured to transfer data,
wherein the electronic terminal uses one or more of the processor, the memory, and the data interface to:

obtain a first token set associated with a first entity, the first token set comprising a plurality of identifiable tokens, adapt the first token set based on an interaction between the first entity and a second entity, based on a second token set associated with the second entity, the first token set being altered to increasingly resemble the second set, and based on the first token set, the second token set being altered to increasingly resemble the first token set, obtain information regarding a plurality of token sets associated with a corresponding plurality of entities, determine an indication of similarity between the first token set and each set in said plurality of token sets, and based on the determined indications of similarity, establish a recommendation regarding a sub-set of one or more entities from said plurality of entities, wherein the first entity obtains at least part of the second token set and alters the first token set to increasingly resemble the second token set using the obtained part of the second token set, and the second entity obtains at least part of the first token set and alters the second token set to increasingly resemble the first token set using the obtained part of the first token set.

18. A system comprising:

at least one network server; and an electronic terminal device, comprising a processor configured to process data, a memory configured to store data, and a data interface configured to transfer data, the electronic terminal device using one or more of the processor, the memory, and the data interface to:

obtain a first token set associated with a first entity, the first token set comprising a plurality of identifiable tokens, adapt the first token set based on an interaction between the first entity and a second entity, based on a second token set associated with the second entity, the first token set being altered to increasingly resemble the second set, and based on the first token set, the second token set being altered to increasingly resemble the first token set, obtain information regarding a plurality of token sets associated with a corresponding plurality of entities, determine an indication of similarity between the first token set and each set in said plurality of token sets, and based on the determined indications of similarity, establish a recommendation regarding a sub-set of one or more entities from said plurality of entities, wherein the first entity obtains at least part of the second token set and alters the first token set to increasingly resemble the second token set using the obtained part of the second token set, and the second entity obtains at least part of the first token set and alters the second token set to increasingly resemble the first token set using the obtained part of the first token set.

19. A computer program product comprising a non-transitory computer-readable storage medium having computer readable program code embodied therein for providing recommendations of entities, said computer program code comprising a method comprising:

obtaining a first token set associated with a first entity, the first token set comprising a plurality of identifiable tokens;

adapting the first token set on the basis of interaction between the first entity and a second entity, based on a second token set associated with the second entity, the first token set being altered to increasingly resemble the second set, and based on the first token set, the second token set being altered to increasingly resemble the first token set;

obtaining information regarding a plurality of token sets associated with a corresponding plurality of entities;

determining an indication of similarity between the first token set and each set in said plurality of token sets; and based on the determined indications of similarity, establishing a recommendation regarding a sub-set of one or more entities from said plurality of entities, wherein the first entity obtains at least part of the second token set and alters the first token set to increasingly resemble the second token set using the obtained part of the second token set, and the second entity obtains at least part of the first token set and alters the second token set to increasingly resemble the first token set using the obtained part of the first token set.

20. The method according to claim 1, wherein the at least one electronic device includes a mobile terminal, and wherein the first entity a user of said at least one electronic device.

* * * * *